United States Patent
Redondo et al.

(10) Patent No.: US 7,280,556 B2
(45) Date of Patent: Oct. 9, 2007

(54) METHOD OF TRANSFERRING SIGNALS BETWEEN TWO SEPARATE SEND/RECEIVE INTERFACES, THE METHOD INCLUDING PROCESSING OF THE SIGNALS

(75) Inventors: Frédéric Redondo, Sceaux (FR); Philippe Desblancs, Paris (FR)

(73) Assignee: Alcatel, Paris (FR)

( * ) Notice: Subject to any disclaimer, the term of this patent is extended or adjusted under 35 U.S.C. 154(b) by 803 days.

(21) Appl. No.: 09/865,673

(22) Filed: May 29, 2001

(65) Prior Publication Data

US 2002/0044544 A1    Apr. 18, 2002

(30) Foreign Application Priority Data

May 30, 2000  (FR)  ................................ 00 06955

(51) Int. Cl.
H04L 12/66  (2006.01)
H04J 3/12   (2006.01)

(52) U.S. Cl. ...................... 370/463; 370/522
(58) Field of Classification Search ............... 370/315, 370/327, 328, 329, 335, 339, 480, 481, 465, 370/522

See application file for complete search history.

(56) References Cited

U.S. PATENT DOCUMENTS

| | | | |
|---|---|---|---|
| 5,390,175 A * | 2/1995 | Hiller et al. ................. | 370/398 |
| 5,633,868 A * | 5/1997 | Baldwin et al. ............ | 370/331 |
| 5,809,422 A * | 9/1998 | Raleigh et al. ............. | 455/449 |
| 5,878,343 A | 3/1999 | Robert et al. | |
| 6,163,527 A * | 12/2000 | Ester et al. ................. | 370/228 |
| 6,195,346 B1 * | 2/2001 | Pierson, Jr. ................. | 370/352 |
| 6,307,865 B1 * | 10/2001 | Ogasawara et al. ......... | 370/468 |
| 6,404,775 B1 * | 6/2002 | Leslie et al. ................ | 370/466 |
| 6,615,024 B1 * | 9/2003 | Boros et al. ............. | 455/67.14 |
| 6,757,264 B1 * | 6/2004 | Gayrard ...................... | 370/316 |

FOREIGN PATENT DOCUMENTS

| | | |
|---|---|---|
| WO | WO9913664 | 3/1999 |
| WO | WO9940742 | 8/1999 |

* cited by examiner

*Primary Examiner*—Andrew C. Lee
(74) *Attorney, Agent, or Firm*—Sughrue Mion, PLLC

(57) ABSTRACT

A method of transferring information signals between two separate send/receive interfaces which are part of the same communication device includes processing of the signals. The two interfaces use, at least for information data useful to users, referred to as user data, similar transmission structures and protocols, and in particular similar formats and apply opposite processing sequences for a particular incoming signal. One of the interfaces converts modulated data into baseband data and the other of the interfaces converts the baseband data into modulated data, or vice-versa. The method distinguishes between user data and signaling data, applies all processing operations to the signaling data to enable it to be interpreted by each of the interfaces, and applies to the user data only processing operations needed to transfer it from a first of the interfaces to the other of the interfaces without reproducing or reconstituting or interpreting its content.

8 Claims, 3 Drawing Sheets

Sequence iii)

Sequence iv)

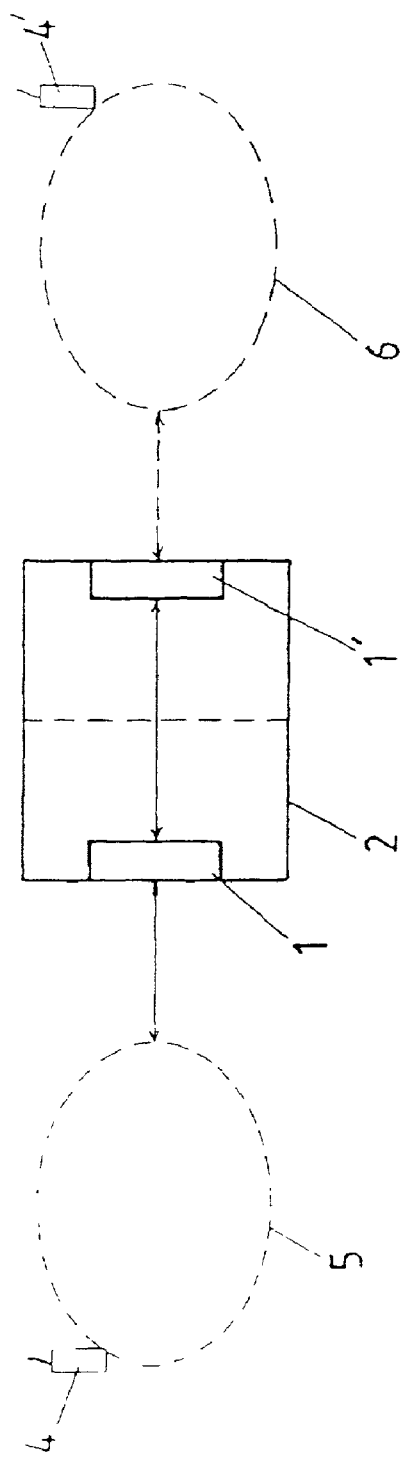
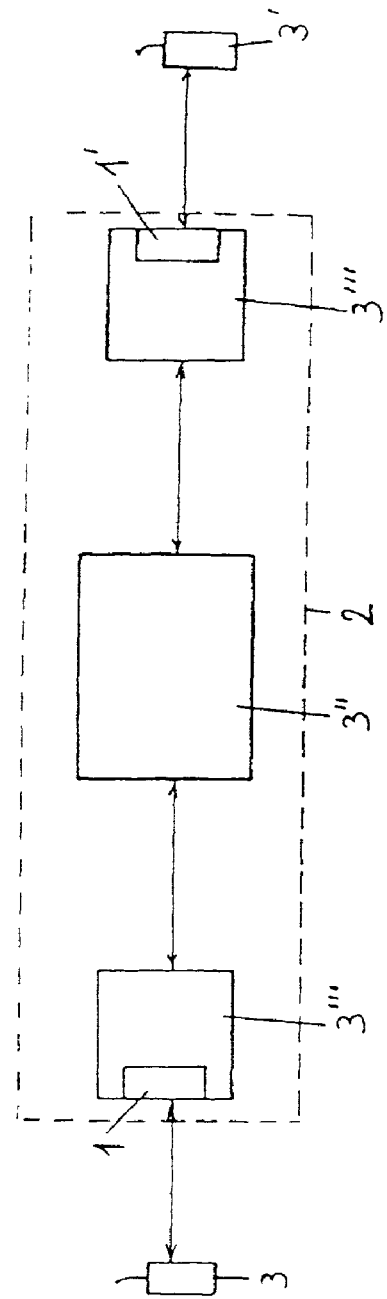
Fig. 3
Fig. 4

METHOD OF TRANSFERRING SIGNALS BETWEEN TWO SEPARATE SEND/RECEIVE INTERFACES, THE METHOD INCLUDING PROCESSING OF THE SIGNALS

CROSS-REFERENCE TO RELATED APPLICATIONS

This application is based on French Patent Application No. 00 06 955 filed May 30, 2000, the disclosure of which is hereby incorporated by reference thereto in its entirety, and the priority of which is hereby claimed under 35 U.S.C. §119.

BACKGROUND OF THE INVENTION

1. Field of the Invention

The present invention relates to transmitting signals, in particular audio signals, between two send/receive interfaces, and provides a method of transferring information signals between two separate interfaces with an optimum transit time, the method including processing of the signals. The present invention also relates to a communication device employing the method.

2. Description of the Prior Art

In many communication systems, and in telecommunication equipment in particular, it is necessary to interconnect at least two send/receive interfaces to establish communication between stations of the same network or two different networks, using similar or even identical information data formats.

In such situations, the processing applied to the data to be transmitted generally causes routing time-delays which can be incompatible with setting up bidirectional communication in real time or virtually in real time, as is required for a telephone or videophone connection.

Existing solutions regenerate the signal completely by applying all of the processing to the whole of the signal, i.e. to the signaling data and to the user data. The time-delay induced in the user data becomes unacceptable to the user and their listening comfort in voice mode if the signals pass through several units of this type in cascade, as the induced time-delays are additive.

The object of the present invention is to propose a simple solution which optimizes time constraints in setting up communication and transferring data between two interfaces without modifying the hardware of the interfaces or of the system incorporating them, without any significant modification of the processing applied to the signals received and sent or to the data to be transferred, and without any additional dedicated processing.

SUMMARY OF THE INVENTION

To this end, the present invention proposes a method of transferring information signals between two separate send/receive interfaces which are part of the same communication device, the method including processing of the signals, wherein the two interfaces use, at least for information data useful to users, referred to as user data, similar transmission structures and protocols, and in particular similar formats and apply opposite processing sequences for a particular incoming signal, one of the interfaces converts modulated data into baseband data and the other of the interfaces converts the baseband data into modulated data, or vice-versa, which method:

distinguishes between user data and signaling data,
applies all processing operations to the signaling data to enable it to be interpreted by each of the interfaces, and
applies to the user data only processing operations needed to transfer it from a first of the interfaces to the other of the interfaces without reproducing or reconstituting or interpreting its content.

The invention will be better understood from the following description, which relates to a preferred embodiment, which is described by way of non-limiting example with reference to the accompanying diagrammatic drawings.

BRIEF DESCRIPTION OF THE DRAWINGS

FIG. 3 is a diagram showing setting up communication between a cordless telephone local area network and a cellular telecommunication network using a device according to the invention.

FIG. 4 is a diagram showing setting up communication between two mobile stations of a cellular telecommunication network using a device according to the invention.

DETAILED DESCRIPTION OF THE PREFERRED EMBODIMENT

As previously indicated, the invention relates to a method of transferring information signals between two separate send/receive interfaces 1, 1', the method including processing of the signals. The two interfaces 1, 1' are part of the same communication device 2 and employ, at least for information data that is useful to users (referred to hereinafter as "user data"), similar transmission structures and protocols, and in particular formats, and apply opposite processing sequences for a particular incoming signal, one of the interfaces converting the modulated data into baseband data and other converting said baseband data into modulated data, or vice-versa.

The method in accordance with the invention
distinguishes between user data and signaling data,
applies all processing operations to the signaling data to enable it to be interpreted by each of the interfaces 1 and 1', and
applies to the user data only processing operations needed to transfer it from a first of the interfaces 1 or 1' to the other of the interfaces 1' or 1 without reproducing or reconstituting or interpreting its content.

Thus the basic principle of the invention is based on distinguishing between signaling data and user data in order to apply only minimum processing to user data, independently of the processing of the signaling data, which, for the purposes of managing the two radio interfaces, is processed completely. This optimizes the transit time of the user data in the equipment.

The invention therefore exploits the similar format of the user data at the two radio interfaces to limit the processing applied to that data and, therefore, the time-delay induced by its passage through the equipment.

Figure 1:
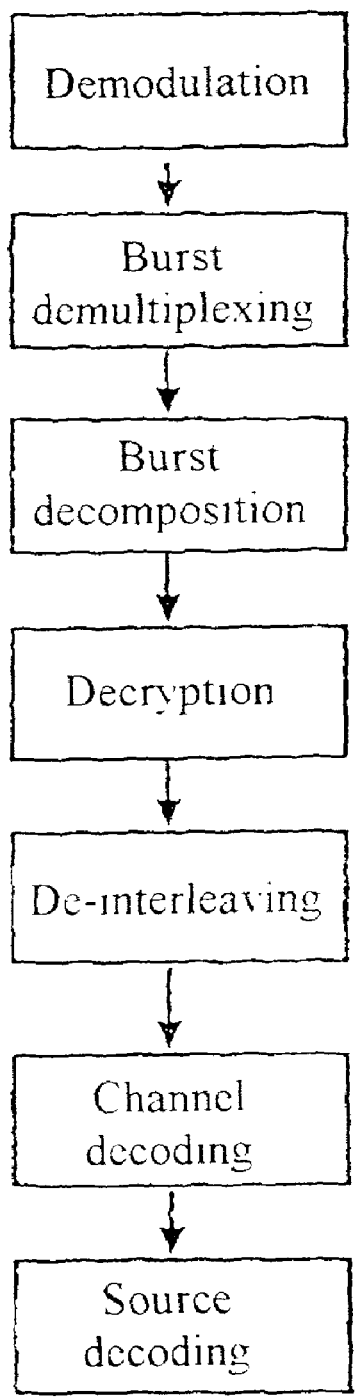
FIG. 1 is a block diagram showing two processing sequences that can be applied to signaling data on setting up communication between two radio-frequency telecommunication networks.
Figure 1:
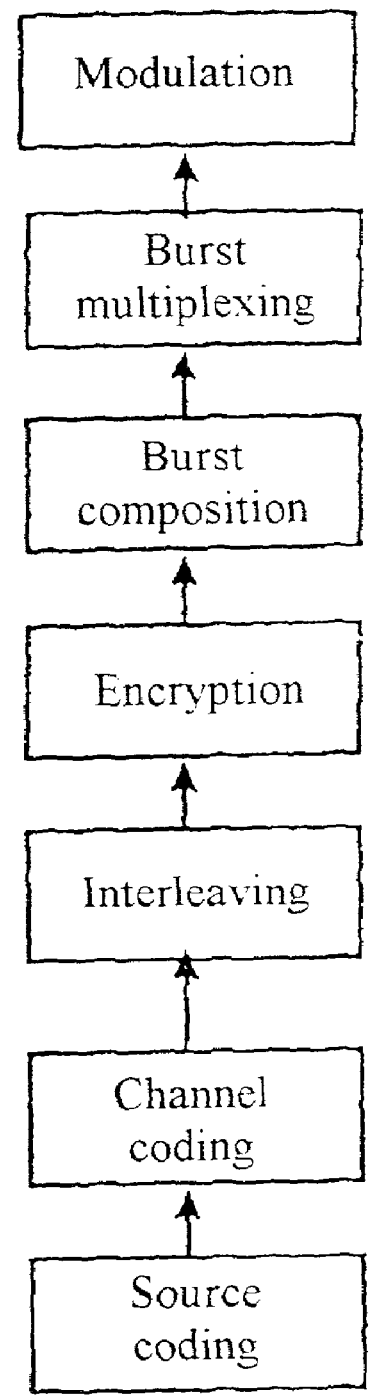
Figure 2:
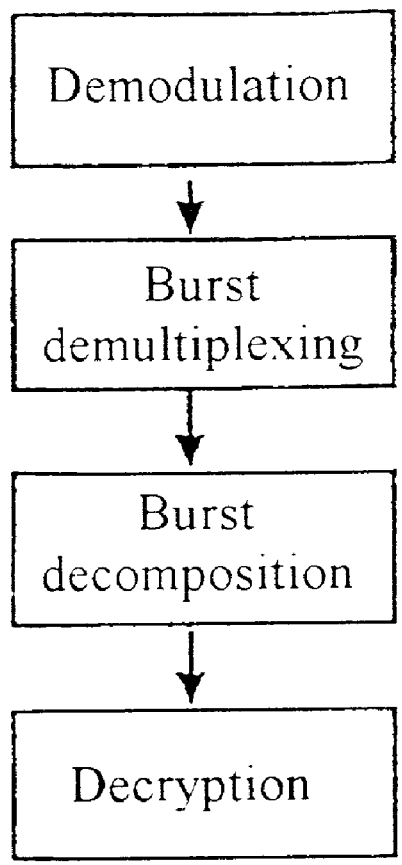
FIG. 2 is a block diagram of two processing sequences applied in accordance with the invention to user data when the two processing sequences shown in FIG. 1 are applied to the signaling data.
Figure 2:
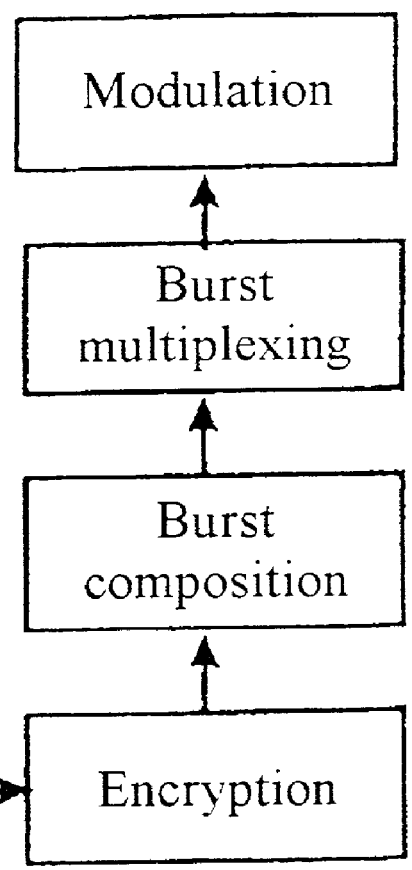

FIGS. 1 and 2 of the accompanying drawings are flowcharts showing the processing sequences applied on transferring data between the two radio-frequency send/receive interfaces 1, 1'.

In the context of this kind of application, when the following two processing sequences i) and ii) are applied to the signaling data:
  i) demodulation/burst demultiplexing/burst decomposition/decryption, and where applicable, data de-interleaving/data channel decoding/source decoding, and
  ii) source coding/channel coding/coded data interleaving/encryption, and where applicable, burst composition/burst multiplexing/modulation then only the following restricted processing sequences iii) and iv) are applied to the user data by the interfaces 1 and 1' concerned:
  iii) demodulation/burst demultiplexing/burst decomposition/decryption, where applicable, and
  iv) encryption, and where applicable, burst composition/burst multiplexing/modulation.

The nature and the object of the functions referred to above are briefly explained hereinafter.

The demodulation function of the transmission system or of the processing sequence i) or iii) converts the analog radio-frequency signal received from the antenna into a baseband digital bit stream.

The burst demultiplexing function of processing sequence i) or iii) routes bursts as a function of the nature of the information or data that they contain and therefore as a function of the frame number (FN) of the corresponding frame.

The burst decomposition function extracts the encoded and encrypted data bits from the bits of a normal burst (in particular by dissociating drag bits and training sequence bits).

If the data transmitted is encrypted, the decrypting function (sequences i) and iii)) applies a logic operator (exclusive-OR) to the received data and a pseudorandom sequence supplied by the encryption algorithm. The pseudo-random sequence is in particular a function of the direction of the link but also of the frame number FN and the session key Kc.

The received data de-interleaving function (sequence i)) re-orders the decrypted data.

The data channel decoding function (sequence i)) recomputes the bits of the speech block initially sent by the system from the bits regenerated after processing the received signal. This function requires considerable computing power.

The audio source decoding function (sequence ii)) regenerates the 20 ms of the analog audio signal (the signal fed to the loudspeaker) from the reconstituted bits after channel decoding.

The audio source coding function of processing sequence ii) is the dual of the audio source decoding function. Executed by the vocoder or voice synthesizer, this function codes 20 ms of speech recorded via the microphone in the form of a particular number of bits to constitute a speech block.

The channel coding function (sequence ii)) is the dual of the channel decoding function. It computes the bits constituting the protected speech block (as a function of various protection classes) from bits supplied by the vocoder.

The coded data interleaving function is the dual of the de-interleaving function.

The encryption function of sequences ii) and iiii) is the dual of the decryption function. It applies the encryption algorithm to the protected coded data with parameters relating to the radio link of the system concerned.

The burst composition function is the dual of the burst decomposition function.

The burst multiplexing function is the dual of the burst demultiplexing function.

The modulation function is the dual of the demodulation function. It generates the radio-frequency analog signal from binary data to send it to the air interface in accordance with the parameters relating to the air interface used by the system (frequency, power, etc.).

In a first embodiment of the invention, shown in figure 3 of the appended drawings, the two interfaces 1 and 1' are radio interfaces, one being a radio interface for a cordless telephone 4 of a local area network 5, for example a CTS network, and the other being a radio interface for a cellular telecommunication network 6 for a mobile station 4', for example a GSM network. The interfaces 1, 1' are part of the fixed base station 2 of the cordless telephone local area network 5.

For information on the CTS local area network the skilled person can refer in particular to the 1999 versions of ETSI Recommendations 02.56, 03.56 and 05.56. GSM (Global System for Mobile communication) networks are well-known in themselves.

In a second embodiment of the invention, shown in figure 4 of the appended drawings, the two interfaces 1 and 1' are radio interfaces which are part of the communication device, which also includes a controller 3" of sender-receiver centers or base stations 3''' of a radiocommunication network including fixed base stations 3''' distributed over a given territory and a plurality of mobile stations 3 and 3+, such as cellular telephones.

Note that, independently of the nature of the user data transmitted (speech, text, pictures, etc.) and the processing sequence or transmission system used, the signaling data must be completely decoded and interpreted by each of the interfaces 1 and 1'. In the case of radio telecommunication, for example, the operation of the complete system is therefore maintained to apply the standard processing to the signal data contained in the slow associated control channel (SACCH) and also in the traffic channel (TCH) in the case of the fast associated control channel (FACCH).

To be able to authorize the use of communication functions requiring complete reproduction of the user data at the communication device 2, the application of the restricted processing sequences to the user data can be made a function of the activated or de-activated state of a communication function necessitating specific additional processing of the reproduced or reconstituted user data.

Accordingly, using the restricted processing sequences iii) and iiii), forming a functional transmission system with optimum transfer time, cannot support the three-way conference call function, for example.

In the first embodiment referred to above, this function connects two CTS cordless telephones with a remote party via a GSM link. To be able to offer this function, it must be possible to apply linear processing to the speech signals of the three links taken in pairs, which requires at least performing all of the processing on the various signals that correspond to non-linear processing, in particular channel decoding. Excluding its implementation in the GSM network, this function can be offered only if the transmission system includes the channel decoding function or module.

Rather than imposing permanently all of the processing needed for the three-way conference call function, leading to long processing and transfer times, the following can be envisaged:
  when the three-way conference call function is not activated, the transmission system used corresponds to the optimum transfer time transmission system, and
  when the three-way conference call function is activated, the complete transmission system is used (up to and including regeneration by the vocoder, with speech decoding and linear processing of the audio signals); in this case, operating mode switching is effected and the resulting degraded transfer time must be tolerated.

Consequently, the long transfer time affects the user data transmitted only if the three-way conference call function is activated, because the complete processing sequence systematically applied to the signaling data is then applied to the user data. The three-way conference call function is activated/de-activated by switching the user data transmission system between the two operating modes.

Note also that because the restricted processing sequences are applied to the user data, no error correcting processing is applied to that data and the channel coding must be sufficiently robust to withstand the cumulative errors generated at the two interfaces 1 and 1'.

However, the fixed base stations 3''' of cellular radiocommunication networks generally incorporate algorithms for adapting links with mobiles. This processing, based on measuring the bit error rate (BER) from a mobile, and enabling the base station concerned to adapt its radio parameters to obtain a minimum error rate at all times at the interface through which the mobile concerned is connected, can be transposed to the context of the present invention, if necessary.

Another object of the present invention is to provide a communication device integrating at least two separate send/receive interfaces using, at least for information data useful to users, referred to as user data, similar transmission structures and protocols, and in particular formats, and applying opposite processing sequences for a particular incoming signal, wherein one of the interfaces converts modulated data into baseband data and the other of the interfaces converts the baseband data into modulated data, or vice-versa, and information signals are transferred between the two interfaces in accordance with a method of transferring information signals between two separate send/receive interfaces which are part of the same communication device, the method including processing of the signals, wherein the two interfaces use, at least for information data useful to users, referred to as user data, similar transmission structures and protocols, and in particular similar formats and apply opposite processing sequences for a particular incoming signal, one of the interfaces converts modulated data into baseband data and the other of the interfaces converts the baseband data into modulated data, or vice-versa, in which device information signals are transferred between the two interfaces 1 and 1' by the method described above.

In one advantageous embodiment of the invention the two interfaces 1 and 1' are radio interfaces providing transmission between stations 3, 3' of the same network or between stations 4, 4' of two different networks 5, 6.

In accordance with two preferred embodiments, the communication device 2 can either include a controller 3" of sender-receiver centers or base stations, controlling at least two base stations 3''' of a cellular radiocommunication network including fixed base stations 3''' distributed over a given territory and a plurality of mobile stations 3', such as cellular telephones (FIG. 3), or consist of a fixed base station 2 of a cordless telephone local area network 5, for example a CTS network, one of the interfaces 1 providing the connection to the mobile station or stations 4 of the local area network 5 and the other interface 1' providing the connection to one or more fixed mobile station or stations 4' of a cellular telecommunication network 6, for example a GSM network (FIG. 4).

Of course, the invention is not limited to the embodiments described and shown in the accompanying drawings, which can be modified, in particular from the point of view of the composition of the various components or by substituting technical equivalents, without departing from the scope of the invention.

The invention claimed is:

1. A method of transferring information signals between two separate send/receive interfaces which are part of the same communication device, the method including processing of said signals, wherein said two interfaces use, at least for information data useful to users, referred to as user data, similar transmission structures and protocols, and in particular similar formats and apply opposite processing sequences for a particular incoming signal, and wherein one of said interfaces converts modulated data into baseband data and the other of said interfaces converts said baseband data into modulated data, or vice-versa, said method also comprising the steps of:

distinguishing between user data and signaling data, applying to said signaling data all processing operations needed to enable it to be interpreted by each of said interfaces, and applying to said user data only processing operations needed to transfer it from a first of said interfaces to the other of said interfaces without reconstituting or interpreting its content, wherein, when the following two processing sequences i) and ii) are applied to said signaling data:

i) demodulation, burst demultiplexing, burst decomposition, decryption, and ii) source coding, channel coding, coded data interleaving, encryption, then only the following restricted processing sequences iii) and iv) are applied to said user data by the interfaces concerned:

iii) demodulation, burst demultiplexing, burst decomposition, decryption, and iv) encryption.

2. The method claimed in claim 1 wherein said restricted processing sequences are applied to said user data as a function of an activated or de-activated state of a communication function requiring specific additional processing of reproduced or reconstituted user data.

3. The method claimed in claim 1, wherein said two interfaces are radio interfaces, one of them is a radio interface for a cordless telephone local area network, the other is a radio interface for a cellular telecommunication network for mobile stations, and said interfaces are part of a fixed base station of said cordless telephone local area network.

4. The method claimed in claim 1, wherein said two interfaces are radio interfaces which are part of the communication device which also comprises a controller of sender-receiver centers or base stations of a radiocommunication network including fixed base stations distributed over a given territory and a plurality of mobile stations such as cellular telephones.

5. The method claimed in claim 1, wherein processing sequence i) includes data de-interleaving, data channel decoding, source decoding, processing sequence ii) includes burst composition, burst multiplexing, modulation, and processing sequence iv) includes burst composition, burst multiplexing, modulation.

6. A communication device integrating at least two separate send/receive interfaces using, at least for information data useful to users, referred to as user data, similar transmission structures and protocols, and in particular formats, and applying opposite processing sequences for a particular incoming signal, wherein one of said interfaces converts modulated data into baseband data and the other of said interfaces converts said baseband data into modulated data, or vice-versa, information signals are transferred between said two interfaces, wherein applied to said signaling data are all processing operations needed to enable it to be interpreted by each of said interfaces, wherein applied to said user data are only processing operations needed to transfer it from a first of said interfaces to the other of said interfaces without reconstituting or interpreting its content, wherein, when the following two processing sequences i) and ii) are applied to said signaling data:

i) demodulation, burst demultiplexing, burst decomposition, decryption, and ii) source coding, channel coding, coded data interleaving, encryption, then only the following restricted processing sequences iii) and iv) are applied to said user data by the interfaces concerned:

ii) demodulation, burst demultiplexing, burst decomposition, decryption, and iv) encryption, and wherein said two interfaces are radio interfaces, one of them is a radio interface for a cordless telephone local area network, the other is a radio interface for a cellular telecommunication network for mobile stations, and said interfaces are part of a fixed base station of said cordless telephone local area network.

7. A communication device integrating at least two separate send/receive interfaces using, at least for information data useful to users, referred to as user data, similar transmission structures and protocols, and in particular formats, and applying opposite processing sequences for a particular incoming signal, wherein one of said interfaces converts modulated data into baseband data and the other of said interfaces converts said baseband data into modulated data, or vice-versa, information signals are transferred between said two interfaces, wherein applied to said signaling data are all processing operations needed to enable it to be interpreted by each of said interfaces, wherein applied to said user data are only processing operations needed to transfer it from a first of said interfaces to the other of said interfaces without reconstituting or interpreting its content, wherein, when the following two processing sequences i) and ii) are applied to said signaling data:

i) demodulation, burst demultiplexing, burst decomposition, decryption, and ii) source coding, channel coding, coded data interleaving, encryption, then only the following restricted processing sequences iii) and iv) are applied to said user data by the interfaces concerned:

iii) demodulation, demultiplexing, decomposition, decryption, and iv) encryption, wherein said two interfaces are radio interfaces providing transmission between stations of the same network or of two different networks, and wherein said device comprises a controller of sender-receiver centers or base stations controlling at least two base stations of a cellular radiocommunication network including fixed base stations distributed over a given territory and a plurality of mobile stations.

8. A communication device integrating at least two separate send/receive interfaces using, at least for information data useful to users, referred to as user data, similar transmission structures and protocols, and in particular formats, and applying opposite processing sequences for a particular incoming signal, wherein one of said interfaces converts modulated data into baseband data and the other of said interfaces converts said baseband data into modulated data, or vice-versa, and information signals are transferred between said two interfaces, wherein applied to said signaling data are all processing operations needed to enable it to be interpreted by each of said interfaces, wherein applied to said user data are only processing operations needed to transfer it from a first of said interfaces to the other of said interfaces without reconstituting or interpreting its content, wherein said two interfaces are radio interfaces providing transmission between stations of the same network or of two different networks, wherein, when the following two processing sequences i) and ii) are applied to said signaling data:

i) demodulation, burst demultiplexing, burst decomposition, decryption, and ii) source coding, channel coding, coded data interleaving, encryption, then only the following restricted processing sequences iii) and iv) are applied to said user data by the interfaces concerned:

ii) demodulation, burst demultiplexing, burst decomposition, decryption, and iv) encryption, and wherein said device comprises a fixed base station of a cordless telephone local area network, wherein one of said interfaces provides the link with said mobile station or stations of said local area network and the other of said interfaces provides the connection to one or more fixed or mobile stations of a cellular telecommunication network.

* * * * *